(12) United States Patent
Nagase et al.

(10) Patent No.: US 9,136,533 B2
(45) Date of Patent: Sep. 15, 2015

(54) LITHIUM NICKEL MANGANESE COBALT COMPOSITE OXIDE AND LITHIUM RECHARGEABLE BATTERY

(75) Inventors: Ryuichi Nagase, Ibaraki (JP); Yoshio Kajiya, Ibaraki (JP); Hiroshi Tasaki, Ibaraki (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 1071 days.

(21) Appl. No.: 12/159,701

(22) PCT Filed: Dec. 8, 2006

(86) PCT No.: PCT/JP2006/324522
§ 371 (c)(1),
(2), (4) Date: Jun. 30, 2008

(87) PCT Pub. No.: WO2007/083457
PCT Pub. Date: Jul. 26, 2007

(65) Prior Publication Data
US 2009/0200508 A1   Aug. 13, 2009

(30) Foreign Application Priority Data

Jan. 20, 2006 (JP) ................. 2006-011919

(51) Int. Cl.
| | |
|---|---|
| *H01M 4/13* | (2010.01) |
| *H01M 4/505* | (2010.01) |
| *H01M 4/525* | (2010.01) |
| *H01M 10/052* | (2010.01) |
| *C01G 45/12* | (2006.01) |
| *C01G 51/00* | (2006.01) |
| *C01G 53/00* | (2006.01) |

(52) U.S. Cl.
CPC ........... *H01M 4/505* (2013.01); *C01G 45/1228* (2013.01); *C01G 51/50* (2013.01); *C01G 53/50* (2013.01); *H01M 4/525* (2013.01); *H01M 10/052* (2013.01); *C01P 2002/32* (2013.01); *C01P 2002/74* (2013.01); *C01P 2002/82* (2013.01); *C01P 2006/40* (2013.01); *Y02E 60/122* (2013.01)

(58) Field of Classification Search
USPC ................... 252/182.1; 429/218.1, 220, 221, 429/231.95, 224, 223
See application file for complete search history.

(56) References Cited

U.S. PATENT DOCUMENTS

| | | | |
|---|---|---|---|
| 6,242,134 B1 | 6/2001 | Fujiwara et al. |
| 6,497,854 B2 | 12/2002 | Kohiro et al. |
| 6,677,082 B2 | 1/2004 | Thackeray et al. |
| 6,811,923 B1 | 11/2004 | Sakai et al. |
| 6,964,828 B2 | 11/2005 | Lu et al. |
| 7,078,128 B2 | 7/2006 | Lu et al. |
| 7,288,242 B2 | 10/2007 | Tasaki et al. |
| 7,799,301 B2 | 9/2010 | Kajiya et al. |
| 8,062,486 B2 | 11/2011 | Nagase et al. |
| 2002/0150820 A1 | 10/2002 | Kanai et al. |
| 2004/0241084 A1 | 12/2004 | Kajiya et al. |
| 2005/0019661 A1 | 1/2005 | Han et al. |
| 2005/0142440 A1 | 6/2005 | Yamaki et al. |
| 2005/0265909 A1 | 12/2005 | Kajiya et al. |
| 2006/0121350 A1 | 6/2006 | Kajiya et al. |
| 2007/0027015 A1 | 2/2007 | Zhou et al. |
| 2009/0121198 A1 | 5/2009 | Kajiya et al. |
| 2009/0166187 A1 | 7/2009 | Nagase et al. |
| 2011/0031437 A1 | 2/2011 | Nagase et al. |
| 2011/0065002 A1 | 3/2011 | Nagase |

FOREIGN PATENT DOCUMENTS

| | | | | |
|---|---|---|---|---|
| JP | H01-294364 A | | 11/1989 | |
| JP | 11-307094 A | | 11/1999 | |
| JP | 11307094 | * | 11/1999 | |
| JP | 11-345615 A | | 12/1999 | |
| JP | 11345615 | * | 12/1999 | |
| JP | 2002304993 | * | 10/2002 | |
| JP | 2003-059490 A | | 2/2003 | |
| JP | 2005-285572 | * | 10/2005 | ............. H01M 4/58 |
| JP | 2005-285572 A | | 10/2005 | |
| WO | 2006/049001 A1 | | 5/2006 | |

OTHER PUBLICATIONS

English Abstract of JP 2005-251417.
English Abstract of JP 2004-335192.
English Abstract of JP 2003-217580.
English Abstract of JP 2002-338354.
English Abstract of JP 08-198677.
English Abstract of JP 02-221379.
English Abstract of JP 2002-304993.
English Abstract of JP 11-345615.
English Abstract of JP 10-112306.

(Continued)

*Primary Examiner* — Monique Peets
(74) *Attorney, Agent, or Firm* — Howson & Howson LLP

(57) ABSTRACT

This invention provides a lithium nickel manganese cobalt composite oxide having a composition of $LiaNi_xMn_yCo_zO_2$ (x+y+z=1, 1.05<a<1.3), wherein, in the data obtained by measuring a Raman spectrum of the composite oxide, the peak intensity of an Eg oscillation mode of a hexagonal crystal structure located at 480 to 495 $cm^{-1}$ and the peak intensity of an F2g oscillation mode of a spinel structure located at 500 to 530 $cm^{-1}$ in relation to the peak intensity of an A1g oscillation mode having a hexagonal crystal structure in which the main peak is located at 590 to 610 $cm^{-1}$ are respectively 15% or higher and 40% or lower than the peak intensity of the A1g oscillation mode of a hexagonal crystal structure as the main peak. Thereby, the Raman spectrum can be used for the identification of the crystal structure to clarify the characteristics of a positive electrode precursor composed of lithium nickel manganese cobalt composite oxide. In particular, it is possible to obtain lithium nickel manganese cobalt composite oxide and a lithium rechargeable battery superior in rate characteristics and cycle characteristics.

5 Claims, No Drawings

(56) References Cited

OTHER PUBLICATIONS

English Abstract of JP 10-340726.
Co-pending unpublished U.S. Appl. No. 12/297,320.
Co-pending unpublished U.S. Appl. No. 11/718,021.
Esp@cenet database, One Page English Abstract of JP 01-294364 A1, Nov. 28, 1989.
Esp@cenet database, One Page English Abstract of JP 11-307094 A1, Nov. 5, 1999.
Esp@cenet database, One Page English Abstract of JP 2003-059490 A1, Feb. 28, 2003.

* cited by examiner

LITHIUM NICKEL MANGANESE COBALT COMPOSITE OXIDE AND LITHIUM RECHARGEABLE BATTERY

BACKGROUND OF THE INVENTION

The present invention relates to lithium nickel manganese cobalt composite oxide and a lithium rechargeable battery superior in rate characteristics and cycle characteristics.

In recent years, there is a rapidly growing demand for a non-aqueous system lithium rechargeable battery as a high energy density battery. This lithium rechargeable battery is configured from three fundamental components; namely, a positive electrode, a negative electrode, and a separator retaining an electrolyte interposed between these electrodes.

As the positive electrode and negative electrode, a slurry obtained by mixing and dispersing active materials, conductive materials, bonding materials and plasticizing agents (where appropriate) in a dispersion medium is used by being supported by a collector such as a metallic foil or a metallic mesh.

Among the above, a composite oxide of lithium and transition metal is used as the positive electrode active material as represented by cobalt composite oxide, nickel composite oxide, and manganese composite oxide. These lithium composite oxides are generally synthesized by mixing the compound of the main element (carbonate or oxide of Mn, Fe, Co, Ni and the like) and the lithium compound (lithium carbonate and the like) at a prescribed ratio, and subjecting this to heat treatment (oxidation treatment) (refer to Patent Document 1, Patent Document 2 and Patent Document 3).

Under these circumstances, proposed is a ternary positive electrode material having a composition of Ni:Mn:Co=1:1:1 (refer to Patent Document 4). Patent Document 4 describes that it is able to obtain a Li/metal ratio of 0.97 to 1.03 and a discharged capacity of 200 mAh/g. However, this is obtained as a result of the charged final voltage being a high voltage at 4.7V, and if the voltage is cut at 4.3V, the initial discharged capacity will be roughly 150 mAh/g.

Generally speaking, the initial characteristics, the cycle characteristics or the internal resistance of a battery differ significantly depending on the crystal structure of the material. Even if the battery has a layered structure, there is a problem in that the spinel structure that coexists locally will lead to the deterioration of the battery characteristics.

Thus, the identification of the crystal structure is important. Conventionally, XRD (X-ray diffraction method) has been used for the identification of the crystal structure. Nevertheless, it was difficult to assess the coexistence of phases due to the peak positions being near or other reasons.

Accordingly, a proposal has been made for specifying the cathode active material with Raman spectroscopy (refer to Patent Document 5). Although Patent Document 5 specifies the peak intensity ratio of the spinel structure and the hexagonal crystal structure in the Raman spectrum analysis of the chemical formula $LiCoMA_2$ (0.95≤Li≤1.0, A includes O, F, S and P), the main peak is the peak of the spinel structure and, since it is not a layered structure, it cannot be said that sufficient characteristics are being obtained.

As described above, although a lithium rechargeable battery material possesses superior characteristics in comparison to conventional technology, further improvement is demanded with respect to sinterability and battery characteristics.

[Patent Document 1] Japanese Patent Laid-Open Publication No. H1-294364
[Patent Document 2] Japanese Patent Laid-Open Publication No. H11-307094
[Patent Document 3] Japanese Patent Laid-Open Publication No. 2005-285572
[Patent Document 4] Japanese Patent Laid-Open Publication No. 2003-59490
[Patent Document 5] Japanese Patent Laid-Open Publication No. 2005-44785

SUMMARY OF THE INVENTION

In light of the foregoing problems, an object of the present invention is to provide lithium nickel manganese cobalt composite oxide and a lithium rechargeable battery superior in rate characteristics and cycle characteristics which use the Raman spectrum for the identification of the crystal structure to identify the coexisting phases based on the quantity and location of the Raman modes that are observed when the structure or crystal system differs, and use this to clarify the features capable of securing the characteristics.

In order to achieve the foregoing object, the present invention provides:

1) Lithium nickel manganese cobalt composite oxide represented by $Li_aNi_xMn_yCo_zO_2$ (x+y+z=1, 1.05<a<1.3), wherein, in the data obtained by measuring a Raman spectrum of the composite oxide, the peak intensity of an Eg oscillation mode of a hexagonal crystal structure located at 480 to 495 $cm^{-1}$ and the peak intensity of an F2g oscillation mode of a spinel structure located at 500 to 530 $cm^{-1}$ in relation to the peak intensity of an A1g oscillation mode of a hexagonal crystal structure in which the main peak is located at 590 to 610 $cm^{-1}$ are respectively 15% or higher and 40% or lower than the peak intensity of the A1g oscillation mode of a hexagonal crystal structure as the main peak; and 2) A lithium rechargeable battery which uses the lithium nickel manganese cobalt composite oxide according to paragraph 1) above as a cathode active material.

According to the present invention, the lithium nickel manganese cobalt composite oxide and the lithium rechargeable battery using the same yield superior effects of being able to improve the battery characteristics, in particular, the rate characteristics and the cycle characteristics, facilitate the identification of the crystal structure of the lithium nickel manganese cobalt composite oxide, and simplify the characteristic evaluation, and obtain a stable material.

DETAILED DESCRIPTION OF THE INVENTION

As a result of using the Raman spectrum in the lithium nickel manganese cobalt composite oxide of the present invention, the coexisting phases can be easily detected since the quantity or location of the observed Raman modes will differ when the structure or crystal system differs. This is used to clarify the features capable of securing the characteristics. Specifically, in the Raman spectrum obtained by measuring the lithium nickel manganese cobalt composite oxide using the Raman spectrophotometer, attention is focused on the following three peaks that are indicated in a previous document (e.g., C. Julian, "Solid State Ionics" Vol. 136-137, 2 (2000) 887-896).

1) Main peak (hexagonal crystal structure A1g oscillation mode) located at a Raman shift of 590 to 610 $cm^{-1}$
2) Peak (hexagonal crystal structure Eg oscillation mode) located at a Raman shift of 480 to 495 $cm^{-1}$ 3) Peak (spinel structure F2g oscillation mode) located at a Raman shift of 500 to 530 cm$^{-1}$ As a result of conducting a detailed review of the peak intensity and battery characteristics of the foregoing peaks, it has been discovered that the coexistence of the hexagonal crystal structure Eg oscillation mode and the spinel structure F2g oscillation mode in a given quantity is a factor that makes it difficult for the post-cycle crystal structure to change.

The lithium nickel manganese cobalt composite oxide of the present invention has a composition of $LiaNixMnyCozO_2$ (x+y+z=1, 1.05<a<1.3).

The reason x+y+z=1 is used is that this composition is able to maintain the hexagonal crystal structure. Foregoing 1.05<a<1.3 shows the ratio of Li to all metals. If a is 1.05 or less, a problem arises in that the cycle characteristics or rate characteristics easily deteriorate, and if a is 1.3 or more, this is undesirable since there is a problem in that, since Li is beyond the range of becoming a solid solution, it is easy for Li to remain in the material, thereby making the application of the electrode film difficult, and further causing the generation of gas in the battery.

The Raman spectroscopy spectrum of the lithium nickel manganese cobalt composite oxide of the present invention is measured using a Raman spectrophotometer (for instance, manufactured by Renishaw K.K.). The measurement is conducted, for instance, at an exposure time of 20 seconds, an exposure count of 10 times, and a measurement range of 200 to 700 cm$^{-1}$. The spectrum after measurement is subject to baseline correction and leveling treatment in order to obtain data of the Raman spectroscopy spectrum.

The lithium nickel manganese cobalt composite oxide of the present invention to become the cathode active material is of an A1g oscillation mode of a hexagonal crystal structure in which the main peak is located at 590 to 610 cm$^{-1}$. Further, the peak intensity of an Eg oscillation mode of a hexagonal crystal structure located at 480 to 495 cm$^{-1}$ and the peak intensity of an F2g oscillation mode of a spinel structure located at 500 to 530 cm$^{-1}$ are respectively 15% or higher and 40% or lower than the peak intensity of the A1g oscillation mode of a hexagonal crystal structure as the main peak.

If this is less than 15%, the hexagonal crystal structure will not be strong, and if it is higher than 40%, the spinel structure other than the hexagonal crystal structure will develop, and both of these cases will induce the deterioration in the cycle characteristics and rate characteristics. Thus, more preferably, the peak intensity is 20% or higher and 30% or lower.

It is thereby possible to obtain lithium nickel manganese cobalt composite oxide superior in rate characteristics and cycle characteristics. This is a significant feature of the present invention.

For the manufacture of the lithium nickel manganese cobalt composite oxide, the method described in Japanese Patent Laid-Open Publication No. 2005-285572 can be used. The precursor for use in the positive electrode material to be manufactured with this method contributes to the characteristic expression since each of the metal elements is evenly dispersed at a nano-level.

For example, a precursor (carbonate) can be manufactured by preparing a metal salt solution of one or more types of metal element selected from Mn, Co and Ni, suspending lithium carbonate in water, and introducing the prepared metal salt solution in the lithium carbonate suspension. Chloride solution or sulfate solution may be used as the metal salt solution. The lithium carbonate suspension (w: mole) can be decided according to the following formula.

[w=amount of all metal components (mole)×(1+0.5x)] (provided x: Li content/amount of all metal components required in the positive electrode material)

Further, carbonate powder is obtained by filtering, cleansing, drying and thereafter oxidizing the obtained carbonate cake. For example, the obtained carbonate is cleansed with a saturated lithium carbonate solution or ethanol. Moreover, the obtained carbonate precursor is subject to oxidation treatment in the atmosphere at 800 to 1100° C. for 1 to 10 hours.

Standard industrial methods will be sufficient for performing the foregoing filtering, cleansing, drying and oxidizing process. In other words, filtration under reduced pressure, filter press or the like can be used in the filtering and cleansing process. And a ventilation furnace, continuous furnace, spray drier or the like can be used in the drying and oxidizing process.

The ensemble of lithium nickel manganese cobalt composite oxide particles subject to oxidation treatment can undergo appropriate size control to be used as a positive electrode material of the lithium rechargeable battery. Standard industrial methods can be used for size control; that is, a pulverizer or a classifier may be used.

EXAMPLES

Examples and Comparative Examples of the present invention are now explained. Incidentally, these examples are merely illustrative, and the present invention shall in no way be limited thereby. In other words, the present invention shall include the various modes and modifications covered by the technical idea of this invention.

Examples 1 to 7

Manufacturing Method and Analytical Method of Active Material

A carbonate to become a precursor was prepared with lithium carbonate and various metal chlorides as the raw material, this was dried, and then subject to oxidation by changing the calcinating conditions to prepare various types of positive electrode active materials. Specifically, a metal salt solution (chloride solution or sulfate solution) was introduced in a lithium carbonate suspension to precipitate carbonate. The lithium carbonate solution (w: mole) was determined according to the following formula.

[w=amount of all metal components (mole)×(1+0.5x)] (provided x: Li content/amount of all metal components required in the positive electrode material)

The obtained carbonate was cleansed with a saturated lithium carbonate solution. The obtained carbonate precursor was subject to oxidation treatment in the atmosphere at 800 to 1100° C. for 1 to 10 hours in order to prepare various types of active materials. All of these active materials were confirmed to be a layered structure of $Li_{1.1}Ni_{1/3}Mn_{1/3}Co_{1/3}O_2$ by using X-ray diffraction.

The Raman spectrum of the various positive electrode active materials was measured using a Raman spectrophotometer (Renishaw inVia Reflex). The measurement was conducted using Ar laser of 532 nm with an exposure time of 20 seconds, an exposure count of 10 times, and an output of 10% in a range of 200 to 700 cm$^{-1}$. After measurement, the Raman spectrum was subject to baseline correction and smoothing treatment, and then analyzed.

In the analysis, the intensity of the main peak located at a Raman shift of 590 to 610 cm$^{-1}$, the peak 1 located at 480-495 cm$^{-1}$ and the peak 2 located 500-530 cm$^{-1}$ was measured, and the intensity ratio of peaks 1 and 2 in relation to the main peak was checked.

<Battery Characteristic Evaluation Method of Active Material>

These positive electrode materials were used to prepare an electrode film, and the battery characteristics were checked. The electrode film was prepared at a ratio of active material 85%, binder 8%, and conductive material 7% as a result of being kneaded with NMP as the solvent and applied to the Al foil, dried, and thereafter pressed.

Moreover, a 2032-type coin cell for evaluation with Li as the counter electrode was prepared, and electrolyte obtained by dissolving 1M-LiPF$_6$ to EC (ethylene carbonate)-DMC (dimethyl carbonate) (1:1) was used to evaluate the initial capacity, initial efficiency and the capacity retention after 20 cycles at 25° C.

The charging conditions were a constant current/constant voltage condition of a final voltage of 4.3V, and the discharging conditions were a constant current condition of a final voltage of 3.0V. In addition, the ratio of the capacity that can be extracted when discharged at a current value required for discharging the capacity of the material in 30 minutes and the capacity that can be extracted when discharged at a current value required for discharging the capacity of the material in 6 hours was evaluated as the capacity retention at a 2C rate.

The relationship of the analysis of the Raman spectrum of the various active materials and the battery characteristics is shown in Table 1.

hexagonal crystal structure, and the peak intensity ratio in relation to the main peak was 22%. Moreover, the peak 2 located at a Ramon shift of 500 to 530 cm$^{-1}$ showed an F2g oscillation mode of a spinel structure, but the peak intensity ratio in relation to the main peak was 22%.

As a result of similar analysis, the peak intensity ratio of the peak 1 of Example 2 located at a Raman shift of 480 to 495 cm$^{-1}$ in relation to the main peak was 15%, and the peak intensity ratio of the peak 2 located at a Raman shift of 500 to 530 cm$^{-1}$ in relation to the main peak was 15%.

The peak intensity ratio of the peak 1 of Example 3 located at a Raman shift of 480 to 495 cm$^{-1}$ in relation to the main peak was 15%, and the peak intensity ratio of the peak 2 located at a Raman shift of 500 to 530 cm$^{-1}$ in relation to the main peak was 25%.

The peak intensity ratio of the peak 1 of Example 4 located at a Raman shift of 480 to 495 cm$^{-1}$ in relation to the main peak was 15%, and the peak intensity ratio of the peak 2 located at a Raman shift of 500 to 530 cm$^{-1}$ in relation to the main peak was 40%.

The peak intensity ratio of the peak 1 of Example 5 located at a Raman shift of 480 to 495 cm$^{-1}$ in relation to the main peak was 40%, and the peak intensity ratio of the peak 2 located at a Raman shift of 500 to 530 cm$^{-1}$ in relation to the main peak was 15%.

The peak intensity ratio of the peak 1 of Example 6 located at a Raman shift of 480 to 495 cm$^{-1}$ in relation to the main peak was 40%, and the peak intensity ratio of the peak 2 located at a Raman shift of 500 to 530 cm$^{-1}$ in relation to the main peak was 25%.

TABLE 1

| | Peak Intensity Ratio (%) | | Battery Characteristics | | | |
| --- | --- | --- | --- | --- | --- | --- |
| | Peak 1 (480-495 cm$^{-1}$) | Peak 2 (500-530 cm$^{-1}$) | Initial Capacity (mAh/g) | Initial Efficiency (%) | Cycle Characteristics (%) | 2C Rate Characteristics (%) |
| Example 1 | 22 | 22 | 150 | 90 | 96 | 96 |
| Example 2 | 15 | 15 | 150 | 90 | 95 | 96 |
| Example 3 | 15 | 25 | 150 | 92 | 96 | 96 |
| Example 4 | 15 | 40 | 145 | 90 | 90 | 90 |
| Example 5 | 40 | 15 | 149 | 90 | 92 | 93 |
| Example 6 | 40 | 25 | 150 | 92 | 94 | 95 |
| Example 7 | 40 | 40 | 148 | 90 | 92 | 93 |
| Comparative Example 1 | 22 | 12 | 152 | 86 | 90 | 92 |
| Comparative Example 2 | 22 | 45 | 140 | 80 | 85 | 90 |
| Comparative Example 3 | 8 | 22 | 143 | 83 | 86 | 88 |
| Comparative Example 4 | 42 | 22 | 145 | 85 | 86 | 88 |
| Comparative Example 5 | 15 | 10 | 152 | 86 | 88 | 89 |
| Comparative Example 6 | 15 | 42 | 138 | 80 | 83 | 88 |
| Comparative Example 7 | 40 | 10 | 152 | 85 | 86 | 88 |
| Comparative Example 8 | 40 | 42 | 138 | 85 | 85 | 88 |

<Oscillation Mode and Peak Intensity of Crystal Structure of Examples 1 to 7>

Each of the main peaks of Examples 1 to 7 located at a Raman shift of 590 to 610 cm$^{-1}$ showed an A1g oscillation mode of a hexagonal crystal structure.

Meanwhile, the peak 1 of Example 1 located at a Raman shift of 480 to 495 cm$^{-1}$ showed an Eg oscillation mode of a The peak intensity ratio of the peak 1 of Example 7 located at a Raman shift of 480 to 495 cm$^{-1}$ in relation to the main peak was 40%, and the peak intensity ratio of the peak 2 located at a Raman shift of 500 to 530 cm$^{-1}$ in relation to the main peak was 40%.

Accordingly, it has been confirmed that each of the Examples 1 to 7 satisfies the condition of the present invention of being 15% or higher and 40% or lower than the peak intensity of the A1g oscillation mode having a hexagonal crystal structure as the main peak.

<Battery Characteristics of Examples 1 to 7>

The battery characteristics of Examples 1 to 7 of the present invention shown in Table 1 are explained as follows.

The initial capacity of Example 1 was 150 mAh/g and the initial efficiency was 90%, and both were high. The capacity retention (cycle characteristics) after 20 cycles was 96% and extremely efficient. The capacity retention at a 2C rate was 96%, and similarly showed favorable characteristics.

The initial capacity of Example 2 was 150 mAh/g and the initial efficiency was 90%, and both were high. The capacity retention (cycle characteristics) after 20 cycles was 95% and extremely efficient. The capacity retention at a 2C rate was 96%, and similarly showed favorable characteristics.

The initial capacity of Example 3 was 150 mAh/g and the initial efficiency was 92%, and both were high. The capacity retention (cycle characteristics) after 20 cycles was 96% and extremely efficient. The capacity retention at a 2C rate was 96%, and similarly showed favorable characteristics.

The initial capacity of Example 4 was 145 mAh/g and the initial efficiency was 90%, and both were high. The capacity retention (cycle characteristics) after 20 cycles was high at 90%. The capacity retention at a 2C rate was 90%, and similarly showed favorable characteristics.

The initial capacity of Example 5 was 149 mAh/g and the initial efficiency was 90%, and both were high. The capacity retention (cycle characteristics) after 20 cycles was high at 92%. The capacity retention at a 2C rate was 93%, and similarly showed favorable characteristics.

The initial capacity of Example 6 was 150 mAh/g and the initial efficiency was 92%, and both were high. The capacity retention (cycle characteristics) after 20 cycles was high at 94%. The capacity retention at a 2C rate was 95%, and similarly showed favorable characteristics.

The initial capacity of Example 7 was 148 mAh/g and the initial efficiency was 90%, and both were high. The capacity retention (cycle characteristics) after 20 cycles was high at 92%. The capacity retention at a 2C rate was 93%, and similarly showed favorable characteristics.

Comparative Examples 1 to 8

Manufacturing Method and Analytical Method of Active Material

By using the same processing procedures as Example 1, a carbonate as a precursor was prepared from a lithium carbonate and metal chlorides as raw materials. The precursor prepared was dried and then subjected to oxidation treatment of calcination under variously changed calcinating conditions to obtain positive electrode active materials having various characteristics. Each of the positive electrode active materials of the comparative examples was confirmed to have a layered structure of $Li_{1.1}Ni_{1/3}Mn_{1/3}Co_{1/3}O_2$ by X-ray diffraction analysis.

Further, as with Example 1, the Raman spectrum of the various positive electrode active materials was measured using a Raman spectrophotometer (Renishaw inVia Reflex). The measurement was conducted using Ar laser of 532 nm with an exposure time of 20 seconds, an exposure count of 10 times, and an output of 10% in a range of 200 to 700 $cm^{-1}$. After measurement, the Raman spectrum was subject to baseline correction and smoothing treatment, and then analyzed.

In the analysis, as with Example 1, the intensity of the main peak located at a Raman shift of 590 to 610 $cm^{-1}$, the peak 1 located at 480-495 $cm^{-1}$ and the peak 2 located 500-530 $cm^{-1}$ was measured, and the intensity ratio of peaks 1 and 2 in relation to the main peak was checked.

<Battery Characteristic Evaluation Method of Comparative Examples 1 to 8>

These positive electrode materials were used to prepare an electrode film, and the battery characteristics were checked. As with Example 1, the electrode film was prepared at a ratio of active material 85%, binder 8%, and conductive material 7% as a result of being kneaded with NMP as the solvent and applied to the Al foil, dried, and thereafter pressed.

Moreover, a 2032-type coin cell for evaluation with Li as the counter electrode was prepared, and electrolyte obtained by dissolving 1M-$LiPF_6$ to EC (ethylene carbonate)-DMC (dimethyl carbonate) (1:1) was used to evaluate the initial capacity, initial efficiency and the capacity retention after 20 cycles at 25° C.

The charging conditions were a constant current/constant voltage condition of a final voltage of 4.3V, and the discharging conditions were a constant current condition of a final voltage of 3.0V. In addition, the ratio of the capacity that can be extracted when discharged at a current value required for discharging the capacity of the material in 30 minutes and the capacity that can be extracted when discharged at a current value required for discharging the capacity of the material in 6 hours was evaluated as the capacity retention at a 2C rate.

This is shown in Table 1 together with Example 1.

<Oscillation Mode and Peak Intensity of Crystal Structure of Comparative Example 1>

The main peak of Comparative Example 1 located at a Raman shift of 590 to 610 $cm^{-1}$ showed an A1g oscillation mode of a hexagonal crystal structure. The peak 1 of Comparative Example 1 located at a Raman shift of 480 to 495 $cm^{-1}$ showed an Eg oscillation mode of a hexagonal crystal structure, and the peak intensity ratio in relation to the main peak was 22%. This satisfied the condition of the present invention of being 15% or higher and 40% or lower than the peak intensity of the A1g oscillation mode of a hexagonal crystal structure as the main peak.

Nevertheless, with the peak 2 located at a Ramon shift of 500 to 530 $cm^{-1}$ showed an F2g oscillation mode of a spinel structure, the peak intensity ratio in relation to the main peak was 12%. This did not satisfy the condition of the present invention of being 15% or higher and 40% or lower than the peak intensity of the A1g oscillation mode of a hexagonal crystal structure as the main peak.

<Battery Characteristics of Comparative Example 1>

The initial capacity of Comparative Example 1 shown in Table 1 was high at 152 mAh/g, but the initial efficiency decreased to 86%. The capacity retention (cycle characteristics) after 20 cycles was 90% and the capacity retention at a 2C rate was 92%, and both were not inferior in comparison to the Examples of the present invention.

<Oscillation Mode and Peak Intensity of Crystal Structure of Comparative Example 2>

The main peak of Comparative Example 2 located at a Raman shift of 590 to 610 $cm^{-1}$ showed an A1g oscillation mode of a hexagonal crystal structure. The peak 1 of Comparative Example 2 located at a Raman shift of 480 to 495 $cm^{-1}$ showed an Eg oscillation mode of a hexagonal crystal structure, and the peak intensity ratio in relation to the main peak was 22%. This satisfied the condition of the present invention of being 15% or higher and 40% or lower than the peak intensity of the A1g oscillation mode of a hexagonal crystal structure as the main peak.

Nevertheless, with the peak 2 located at a Ramon shift of 500 to 530 $cm^{-1}$ showed an F2g oscillation mode of a structure, the peak intensity ratio in relation to the main peak was 45%. This did not satisfy the condition of the present invention of being 15% or higher and 40% or lower than the peak intensity of the A1g oscillation mode of a hexagonal crystal structure as the main peak.

<Battery Characteristics of Comparative Example 2>

The initial capacity of Comparative Example 2 shown in Table 1 was 140 mAh/g and the initial efficiency was 80%, and both decreased. The capacity retention (cycle characteristics) after 20 cycles was low at 85% and the capacity retention at a 2C rate was 90%, and both deteriorated in comparison to the Examples of the present invention.

<Oscillation Mode and Peak Intensity of Crystal Structure of Comparative Example 3>

The main peak of Comparative Example 3 located at a Raman shift of 590 to 610 $cm^{-1}$ showed an A1g oscillation mode of a hexagonal crystal structure. The peak 1 of Comparative Example 3 located at a Raman shift of 480 to 495 $cm^{-1}$ showed an Eg oscillation mode of a hexagonal crystal structure, and the peak intensity ratio in relation to the main peak was 8%. This did not satisfy the condition of the present invention of being 15% or higher and 40% or lower than the peak intensity of the A1g oscillation mode of a hexagonal crystal structure as the main peak.

Meanwhile, with the peak 2 located at a Ramon shift of 500 to 530 $cm^{-1}$ showed an F2g oscillation mode of a hexagonal crystal spinel structure, the peak intensity ratio in relation to the main peak was 22%. This satisfied the condition of the present invention of being 15% or higher and 40% or lower than the peak intensity of the A1g oscillation mode of a hexagonal crystal structure as the main peak.

<Battery Characteristics of Comparative Example 3>

The initial capacity of Comparative Example 3 shown in Table 1 was 143 mAh/g and the initial efficiency was 83%, and both decreased. The capacity retention (cycle characteristics) after 20 cycles was low at 86% and the capacity retention at a 2C rate was 88%, and both deteriorated in comparison to the Examples of the present invention.

<Oscillation Mode and Peak Intensity of Crystal Structure of Comparative Example 4>

The main peak of Comparative Example 4 located at a Raman shift of 590 to 610 $cm^{-1}$ showed an A1g oscillation mode of a hexagonal crystal structure. However, the peak 1 of Comparative Example 4 located at a Raman shift of 480 to 495 $cm^{-1}$ showed an Eg oscillation mode of a hexagonal crystal structure, the peak intensity ratio in relation to the main peak was high at 42%. This did not satisfy the condition of the present invention of being 15% or higher and 40% or lower than the peak intensity of the A1g oscillation mode of a hexagonal crystal structure as the main peak.

Meanwhile, the peak 2 of Comparative Example 4 located at a Ramon shift of 500 to 530 $cm^{-1}$ showed an F2g oscillation mode of a spinel structure, and the peak intensity ratio in relation to the main peak was 22%. This satisfied the condition of the present invention of being 15% or higher and 40% or lower than the peak intensity of the A1g oscillation mode of a hexagonal crystal structure as the main peak.

<Battery Characteristics of Comparative Example 4>

The initial capacity of Comparative Example 4 shown in Table 1 was 145 mAh/g and the initial efficiency was 85%, and both decreased. The capacity retention (cycle characteristics) after 20 cycles was low at 86% and the capacity retention at a 2C rate was 88%, and both deteriorated in comparison to the Examples of the present invention.

<Oscillation Mode and Peak Intensity of Crystal Structure of Comparative Example 5>

The main peak of Comparative Example 5 located at a Raman shift of 590 to 610 $cm^{-1}$ showed an A1g oscillation mode of a hexagonal crystal structure. However, the peak 1 of Comparative Example 5 located at a Raman shift of 480 to 495 $cm^{-1}$ showed an Eg oscillation mode of a hexagonal crystal structure, the peak intensity ratio in relation to the main peak was 15%. This satisfied the condition of the present invention of being 15% or higher and 40% or lower than the peak intensity of the A1g oscillation mode of a hexagonal crystal structure as the main peak.

Meanwhile, the peak 2 of Comparative Example 5 located at a Ramon shift of 500 to 530 $cm^{-1}$ showed an F2g oscillation mode of a spinel structure, and the peak intensity ratio in relation to the main peak was 10%. This did not satisfy the condition of the present invention of being 15% or higher and 40% or lower than the peak intensity of the A1g oscillation mode of a hexagonal crystal structure as the main peak.

<Battery Characteristics of Comparative Example 5>

The initial capacity of Comparative Example 5 shown in Table 1 was 152 mAh/g, but the initial efficiency decreased to 86%. The capacity retention (cycle characteristics) after 20 cycles was low at 88% and the capacity retention at a 2C rate was 89%, and both deteriorated in comparison to the Examples of the present invention.

<Oscillation Mode and Peak Intensity of Crystal Structure of Comparative Example 6>

The main peak of Comparative Example 6 located at a Raman shift of 590 to 610 $cm^{-1}$ showed an A1g oscillation mode of a hexagonal crystal structure. However, the peak 1 of Comparative Example 6 located at a Raman shift of 480 to 495 $cm^{-1}$ showed an Eg oscillation mode of a hexagonal crystal structure, the peak intensity ratio in relation to the main peak was 15%. This satisfied the condition of the present invention of being 15% or higher and 40% or lower than the peak intensity of the A1g oscillation mode of a hexagonal crystal structure as the main peak.

Meanwhile, the peak 2 of Comparative Example 6 located at a Ramon shift of 500 to 530 $cm^{-1}$ showed an F2g oscillation mode of a spinel structure, and the peak intensity ratio in relation to the main peak was 42%. This did not satisfy the condition of the present invention of being 15% or higher and 40% or lower than the peak intensity of the A1g oscillation mode of a hexagonal crystal structure as the main peak.

<Battery Characteristics of Comparative Example 6>

The initial capacity of Comparative Example 6 shown in Table 1 decreased to 138 mAh/g, and the initial efficiency decreased considerably to 80%. The capacity retention (cycle characteristics) after 20 cycles was low at 83% and the capacity retention at a 2C rate was 88%, and both deteriorated notably in comparison to the Examples of the present invention.

<Oscillation Mode and Peak Intensity of Crystal Structure of Comparative Example 7>

The main peak of Comparative Example 7 located at a Raman shift of 590 to 610 $cm^{-1}$ showed an A1g oscillation mode of a hexagonal crystal structure. However, with the peak 1 of Comparative Example 7 located at a Raman shift of 480 to 495 $cm^{-1}$ showed an Eg oscillation mode of a hexagonal crystal structure, the peak intensity ratio in relation to the main peak was 40%. This satisfied the condition of the present invention of being 15% or higher and 40% or lower than the peak intensity of the A1g oscillation mode of a hexagonal crystal structure as the main peak.

Meanwhile, the peak 2 of Comparative Example 7 located at a Ramon shift of 500 to 530 $cm^{-1}$ showed an F2g oscillation mode of a spinel structure, and the peak intensity ratio in relation to the main peak was 10%. This did not satisfy the condition of the present invention of being 15% or higher and 40% or lower than the peak intensity of the A1g oscillation mode of a hexagonal crystal structure as the main peak.

<Battery Characteristics of Comparative Example 7>

The initial capacity of Comparative Example 7 shown in Table 1 was 152 mAh/g, but the initial efficiency decreased to 85%. The capacity retention (cycle characteristics) after 20 cycles was low at 86% and the capacity retention at a 2C rate was 88%, and both deteriorated notably in comparison to the Examples of the present invention.

<Oscillation Mode and Peak Intensity of Crystal Structure of Comparative Example 8>

The main peak of Comparative Example 8 located at a Raman shift of 590 to 610 cm$^{-1}$ showed an A1g oscillation mode of a hexagonal crystal structure. However, with the peak 1 of Comparative Example 8 located at a Raman shift of 480 to 495 cm$^{-1}$ showed an Eg oscillation mode of a hexagonal crystal structure, the peak intensity ratio in relation to the main peak was 40%. This satisfied the condition of the present invention of being 15% or higher and 40% or lower than the peak intensity of the A1g oscillation mode of a hexagonal crystal structure as the main peak.

Meanwhile, the peak 2 of Comparative Example 8 located at a Ramon shift of 500 to 530 cm$^{-1}$ showed an F2g oscillation mode of a spinel structure, and the peak intensity ratio in relation to the main peak was 42%. This did not satisfy the condition of the present invention of being 15% or higher and 40% or lower than the peak intensity of the A1g oscillation mode of a hexagonal crystal structure as the main peak.

<Battery Characteristics of Comparative Example 8>

The initial capacity of Comparative Example 8 shown in Table 1 decreased to 138 mAh/g, and the initial efficiency also decreased to 85%. The capacity retention (cycle characteristics) after 20 cycles was low at 85% and the capacity retention at a 2C rate was 88%, and both deteriorated notably in comparison to the Examples of the present invention.

As evident from the comparison of the Examples and the Comparative Examples, when the conditions of the present invention are not satisfied, it has been confirmed that the discharge characteristics; that is, the initial capacity and the initial efficiency will deteriorate, the capacity retention (cycle characteristics) after 20 cycles is low, and the capacity retention at the 2C rate will be aggravated.

The lithium nickel manganese cobalt composite oxide and a lithium rechargeable battery of the present invention are superior in rate characteristics and cycle characteristics, and yield superior effects by using the Raman spectrum for the identification of the crystal structure to identify the coexisting phases based on the quantity and location of the Raman modes that are observed when the structure or crystal system differs, and using this to clarify the features capable of securing the characteristics.

The invention claimed is:

1. Lithium nickel manganese cobalt composite oxide having a composition of $Li_aNi_xMn_yCo_zO_2$ ($x+y+z=1$, $1.05<a<1.3$), wherein, in the data obtained by measuring a Raman spectrum of the composite oxide, the peak intensity of an Eg oscillation mode of a hexagonal crystal structure located at 480 to 495 cm$^{-1}$ and the peak intensity of an F2g oscillation mode of a spinel structure located at 500 to 530 cm$^{-1}$ in relation to the peak intensity of an A1g oscillation mode of a hexagonal crystal structure in which the main peak is located at 590 to 610 cm$^{-1}$ are both respectively 15% or higher and 40% or lower than the peak intensity of the A1g oscillation mode of a hexagonal crystal structure as the main peak.

2. A lithium rechargeable battery which uses the lithium nickel manganese cobalt composite oxide according to claim 1 as a cathode active material.

3. A lithium nickel manganese cobalt composite oxide, consisting of:
   a composition of $Li_aNi_xMn_yCo_zO_2$ ($x+y+z=1$, $1.05<a<1.3$) having a layered crystal structure with coexisting phases, said co-existing phases being identifiable in data obtained by measuring a Raman spectrum of the composite oxide as follows:
   a peak intensity of a hexagonal crystal structure of an A1g oscillation mode located at 590 to 610 cm$^{-1}$ being a main peak;
   a peak intensity of an Eg oscillation mode of a hexagonal crystal structure located at 480 to 495 cm$^{-1}$ being 15% to 40% of said peak intensity of said main peak of said hexagonal crystal structure of said A1g oscillation mode; and
   a peak intensity of an F2g oscillation mode of a spinel structure located at 500 to 530 cm$^{-1}$ being 15% to 40% of said peak intensity of said main peak of said hexagonal crystal structure of said A1g oscillation mode.

4. A lithium nickel manganese cobalt composite oxide, consisting of:
   a composition of $Li_aNi_xMn_yCo_zO_2$ ($x+y+z=1$, $1.05<a<1.3$) having a layered crystal structure with coexisting phases, said co-existing phases being identifiable in data obtained by measuring a Raman spectrum of the composite oxide as follows:
   a peak intensity of a hexagonal crystal structure of an A1g oscillation mode located at 590 to 610 cm$^{-1}$ being a main peak,
   a peak intensity of an Eg oscillation mode of a hexagonal crystal structure located at 480 to 495 cm$^{-1}$ being 20% to 30% of said peak intensity of said main peak of said hexagonal crystal structure of said A1g oscillation mode, and
   a peak intensity of an F2g oscillation mode of a spinel structure located at 500 to 530 cm$^{-1}$ being 20% to 30% of said peak intensity of said main peak of said hexagonal crystal structure of said A1g oscillation mode.

5. A lithium rechargeable battery which includes said lithium nickel manganese cobalt composite oxide according to claim 4 as a cathode active material.

* * * * *